Feb. 18, 1930. E. L. PEARSON 1,747,526
THREE-WHEEL VEHICLE CHASSIS
Original Filed April 8, 1927
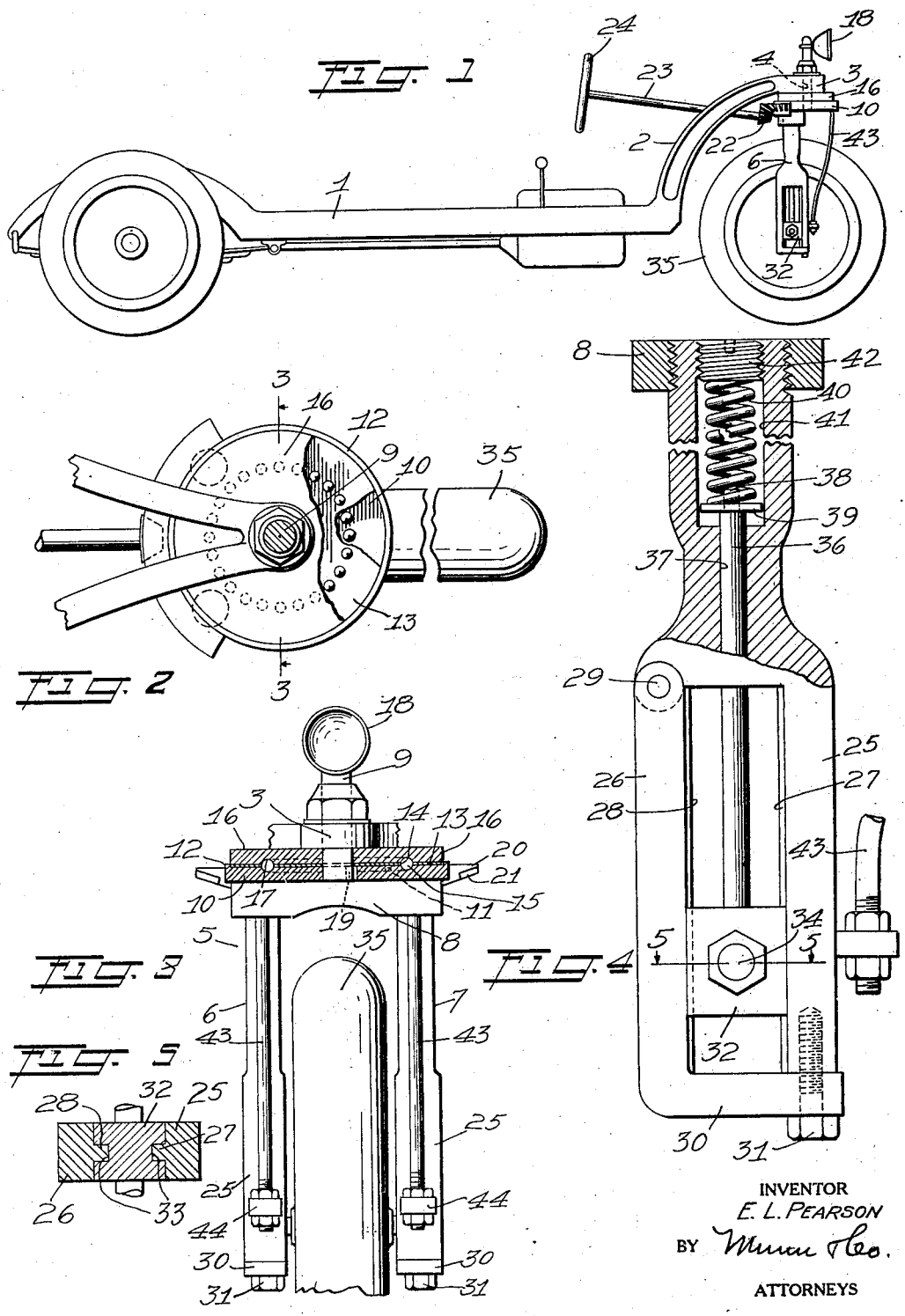
INVENTOR
E. L. PEARSON
BY
ATTORNEYS Patented Feb. 18, 1930

1,747,526

UNITED STATES PATENT OFFICE

ERNEST L. PEARSON, OF CHICAGO, ILLINOIS

THREE-WHEEL VEHICLE CHASSIS

Application filed April 8, 1927, Serial No. 182,137. Renewed July 11, 1929.

My invention relates to improvements in three-wheel vehicle chassis, and it consists in the combinations, constructions, and arrangements herein described and claimed.

An object of my invention is to provide an improvement over my co-pending application, Serial No. 40,309, filed June 29, 1925. The improvement consists in providing a device which moves the front wheel slightly to one side when turning to carry the weight and strain applied thereto, so as to remove the strain from the chassis and prevent the device from turning over.

A further object of my invention is to provide a device of the type described which has novel means for removing the front wheel from the device.

A further object of my invention is to provide a device of the type described which has simple and novel means for moving the headlight with the front wheel.

A further object of my invention is to provide a device of the type described which is durable and efficient for the purpose intended.

Other objects and advantages will appear in the following specification, and the novel features of the invention will be particularly pointed out in the appended claims.

My invention is illustrated in the accompanying drawings, forming part of this application, in which Figure 1 is a side elevation of the device, Figure 2 is a plan view of a portion of the device, parts thereof being broken away, Figure 3 is a section substantially along the line 3—3 of Figure 2, Figure 4 is an enlarged view of a portion of the device, parts thereof being shown in section, and Figure 5 is a section along the line 5—5 of Figure 4.

In carrying out my invention, I provide a frame 1 including two side members which converge at their forward ends, and which are secured to a fork-supporting member 2. The fork-supporting member 2 is provided with a bearing member 3 which has a longitudinal bore 4 disposed vertically therein.

A wheel-supporting fork 5 is provided with downwardly extending side portions 6 and 7 and a head portion 8. A shaft 9 is provided. A lower bearing plate 10 having a ball race 11 and an upwardly extending oil-retaining flange 12 is disposed concentric with the shaft 9 at the mid point thereof, and rests upon the head portion 8. A ball-retainer disc 13 is disposed concentric with the shaft 9, rests upon the lower plate 10, and is provided with a plurality of openings 14 therein equally spaced in a circuitous path substantially adjacent the outer peripheral edge thereof. Ball bearings 15 are disposed in the openings 14 and permitted to ride in the ball race 11. An upper bearing plate 16 is disposed concentric with the shaft 9 and provided with a ball race 17. The bearing member 3 is permitted to rest upon the upper plate 16.

A head lamp 18 is rigidly mounted upon the end of the shaft 9 by any suitable means, and as the shaft 9 is keyed to the lower plate 10 at 19, the head lamp 18 will turn with the lower plate.

An arcuate-shaped gear segment 20 is secured to the peripheral edge of the lower plate 10 at the rear portion thereof. The lower surface of the segment 20 is tapered downwardly and provided with teeth 21. A pinion 22 is disposed in mesh with the segment 20, and is rigidly mounted upon a steering column 23. A steering wheel 24 is disposed at the upper end of the steering column 23, whereby the pinion 22 may be rotated at will.

The head portion 8 is rigidly secured to the lower plate 10 at a point directly in alignment with the rear portion of the ball race 11. The side portions 6 and 7 are provided with guide members 25 and 26 which have longitudinally extending tongue portions 27 and 28, respectively. The guide portions 25 are integral with the side portions 6 and 7, and the guide members 26 are hingedly secured to their respective side portions at 29. The lower ends of the guide portions 26 are provided with laterally extending integral slot members 30 which are secured to their respective guide members 25 by means of screws 31. Bearing members 32 having grooves 33 disposed longitudinally therein are slidably disposed between the guide members 25 and 26, the tongue portions 27 and 28 being received in the grooves 33. A shaft 34 is rotatably mounted within the bearing 32, and a fore wheel 35 is carried by the shaft 34.

Rods 36 which are rigidly secured to the bearing 32 and extend upwardly through openings 37 within the side portions 6 and 7 are provided with reduced portions 38 at the upper ends thereof. Washers 39 are disposed concentric with the reduced portions 38. Compression springs 40 are disposed in relatively large openings 41 in the side portions 6 and 7. The lower ends of the springs are resting upon the washers 39, the upper ends of the springs abutting plugs 42 which are screwed in the openings 41.

Brace rods 43 which have their upper ends rigidly carried by the lower plate 10 pass downwardly and inwardly and have their lower ends adjustably secured to outwardly extending lugs 44 which are integral with the guide portions 25.

From the foregoing description of the various parts of the device, the operation thereof may be readily understood. My improved three-wheel chassis is particularly well adapted for taxi service, and for light delivery cars, where it is necessary to turn about in a narrow street.

One of the most important advantages of the improved construction is the manner in which the fore wheel is swung outwardly in the direction opposite that in which the vehicle is turning. Assuming that the driver wishes to turn to the right, the steering wheel 24 and the steering column 23 are rotated in a clockwise direction, thus rotating the pinion 22 in the same direction and moving the fore wheel 35 to the left, and, at the same time, rotating the wheel about the shaft 9 as a center. This movement of the fore wheel tends to make the car lean toward the right, thereby removing the strain and preventing any possibility of the car turning over. The weight upon the fore wheel is applied directly to the ball bearings 15, independent of the position thereof.

The weight upon the fore wheel 35 is applied thereto through the springs 40, the rods 36, and the bearings 32. The tongue portions 27 and 28 guide the bearings 32 in their longitudinal movement, thus removing any lateral strain from the rods 36.

To remove the fore wheel 35, the screws 31 are first removed, and then the guide portions 26 are moved rearwardly, thus freeing the fore wheel.

I claim:

1. A device of the type described comprising a fork having a head portion, side portions carried by said head portion, stationary guides carried by said side portions, movable guides carried by said side portions, a wheel disposed between said side portions, and bearing members for rotatably carrying said wheel, said bearing members movably disposed between said stationary guides and said movable guides.

2. A device of the type described comprising a fork having a head portion, side portions carried by said head portion, stationary guides carried by said side portions, movable guides carried by said side portions, a wheel disposed between said side portions, bearing members for rotatably carrying said wheel, said bearing members movably disposed between said stationary guides and said movable guides, guide rods movably carried by said side portions, the lower ends of said guide rods secured to said bearing members, and spring means disposed adjacent the upper ends of said guide rods for resiliently securing said side members to said wheel.

3. A device of the type described comprising a fork having a head portion, side portions carried by said head portion, stationary guides carried by said side portions, movable guides carried by said side portions, a wheel disposed between said side portions, bearing members for rotatably carrying said wheel, said bearing members movably disposed between said stationary guides and said movable guides, guide rods movably carried by said side portions, the lower ends of said guide rods secured to said bearing members, spring means disposed adjacent the upper ends of said guide rods for resiliently securing said side members to said wheel, and means for removably securing said movable guides to said stationary guides, whereby said wheel may be removed from said side members.

4. A device of the type described comprising a fork having a head portion, side portions carried by said head portion, stationary guides carried by said side portions, movable guides pivotally mounted upon said side portions, a wheel disposed between said side portions, bearing members for rotatably carrying said wheel, said bearing members being movably disposed between said stationary guides and said movable guides, spring supporting means carried by said side members, and rods movably carried by said side members and disposed between said spring supporting means and said bearing members.

5. A device of the type described comprising a fork having a head portion, side portions carried by said head portion, stationary guides carried by said side portions, movable guides pivotally mounted upon said side portions, a wheel disposed between said side portions, bearing members for rotatably carrying said wheel, said bearing members being movably disposed between said stationary guides and said movable guides, spring supporting means carried by said side members, rods movably carried by said side members and disposed between said spring supporting means and said bearing members, a frame, a bearing plate pivotally mounted at the center thereof to said frame, said head portion secured to said bearing plate eccentric with the pivot point of said bearing plate, and means for moving said bearing plate about the pivot, whereby said fork and said wheel may be moved laterally with respect to said frame.

6. A device of the type described comprising a fork having a head portion, side portions carried by said head portion, stationary guides carried by said side portions, movable guides pivotally mounted upon said side portions, a wheel disposed between said side portions, bearing members for rotatably carrying said wheel, said bearing members being movably disposed between said stationary guides and said movable guides, spring supporting means carried by said side members, rods movably carried by said side members and disposed between said spring supporting means and said bearing members, a frame, a bearing plate pivotally mounted at the center thereof to said frame, said head portion secured to said bearing plate eccentric with the pivot point of said bearing plate, means for moving said bearing plate about the pivot, whereby said fork and said wheel may be moved laterally with respect to said frame, and brace rods carried by said bearing plate and having their ends secured to said side portions for holding said side portions against displacement with respect to said bearing plate.

ERNEST L. PEARSON.